(12) United States Patent
Moriyasu et al.

(10) Patent No.: US 7,046,264 B2
(45) Date of Patent: May 16, 2006

(54) ELECTRONIC DEVICE HAVING DISPLAY UNIT

(75) Inventors: Takashi Moriyasu, Higashiosaka (JP); Hisao Yamada, Yawata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 510 days.

(21) Appl. No.: 10/309,112

(22) Filed: Dec. 4, 2002

(65) Prior Publication Data

US 2003/0103042 A1 Jun. 5, 2003

(30) Foreign Application Priority Data

Dec. 5, 2001 (JP) ........................................ 2001-370981
Nov. 21, 2002 (JP) ........................................ 2002-337377

(51) Int. Cl.
*G06F 1/16* (2006.01)
*G02F 1/1333* (2006.01)
*H04N 5/225* (2006.01)
*A47B 81/06* (2006.01)

(52) U.S. Cl. .......................... 345/905; 361/681; 349/58; 248/917; 348/373

(58) Field of Classification Search ................. 361/681, 361/682; 349/58; 345/905; 248/917; 348/373–376; 312/9.57, 9.56
See application file for complete search history.

(56) References Cited

U.S. PATENT DOCUMENTS 5,233,502 A * 8/1993 Beatty et al. ............... 361/681
5,574,477 A * 11/1996 Shimizu et al. ............. 345/102
5,623,392 A * 4/1997 Ma ............................ 361/681
6,031,524 A * 2/2000 Kunert ....................... 345/173
6,144,552 A * 11/2000 Whitcher et al. ........... 361/681
6,181,380 B1 * 1/2001 Toyofuku et al. ........... 348/373
6,359,270 B1 * 3/2002 Bridson ...................... 219/679
6,379,209 B1 * 4/2002 Tucker ....................... 445/24

FOREIGN PATENT DOCUMENTS

JP 11-149121 6/1999

* cited by examiner

*Primary Examiner*—Regina Liang
*Assistant Examiner*—Duc Q Dinh
(74) *Attorney, Agent, or Firm*—Armstrong, Kratz, Quintos, Hanson & Brooks, LLP (57) ABSTRACT

An electronic device having a cabinet which comprises at least a first cabinet segment having an opening for viewing a display unit therethrough, and a second cabinet segment for the first cabinet segment to be attached thereto. The electronic device comprises a spring member for biasing the display unit in one direction, a stopper member for restraining the movement of the display unit by the spring member, and a positioning member projecting from the rear surface of the first cabinet segment and cooperative with the spring member for holding the display unit therebetween when the first cabinet segment is attached to the second cabinet segment. The display unit or the positioning member is provided with a guide for moving the display unit against the biasing force of the spring member until a side face of the display unit comes into contact with a reference face of the positioning member when the first cabinet segment is attached to the second cabinet segment.

20 Claims, 10 Drawing Sheets

ELECTRONIC DEVICE HAVING DISPLAY UNIT

FIELD OF THE INVENTION

The present invention relates to electronic devices having an LCD or like display unit, typical of which are television sets, personal computers, portable telephones and digital still cameras.

BACKGROUND ART

Display units of the thin type, such as LCD (liquid crystal display), ELD (electroluminescent display) and PDP (plasma display panel), are used in recent years for showing image data or information on television sets and personal computers. More particularly, small LCDs are used in electronic devices having high functionality, such as cellular phones or portable telephones and digital still cameras, for displaying image information, device setting information and information as to the status or state of the device.

With electronic devices equipped with such a display unit, the display unit is generally housed in the cabinet of the electronic device and has a display panel which is visible through an opening of the cabinet. Many of display units provided in small devices show setting information (e.g., characters showing the operation mode) or state information (e.g., a graphic representation indicating the remaining capacity of battery) in a region in close proximity to an edge of the opening. In assembling the electronic device, therefore, the display unit must be fixed to the cabinet, as positioned in the opening with high accuracy. Otherwise, the information will become partly hidden by the cabinet after the electronic device has been completed. In view of the assembling work efficiency, it is also desired that the electronic device have a mechanism permitting the display unit to be positioned and fixed in place readily.

Figure 11A:
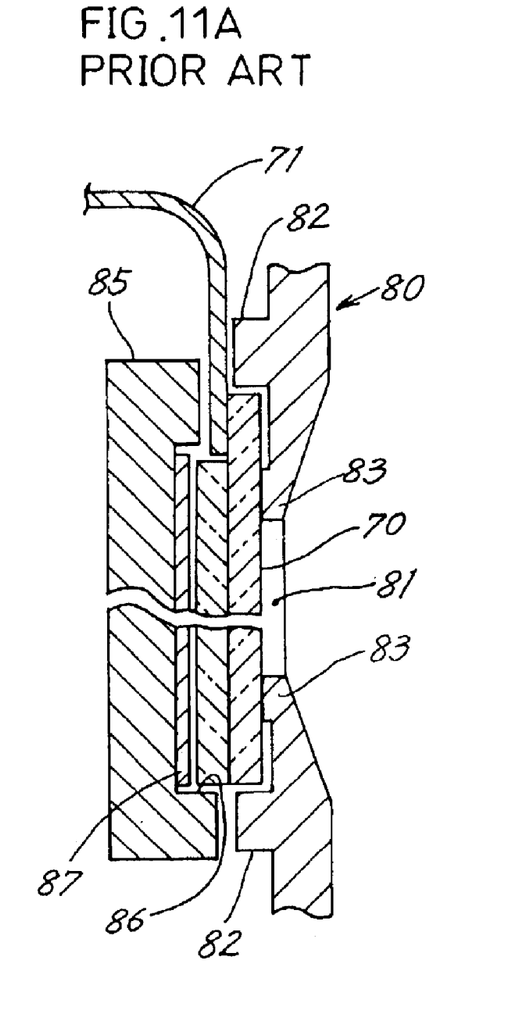
FIG. 11a shows a first conventional example.
Figure 11B:
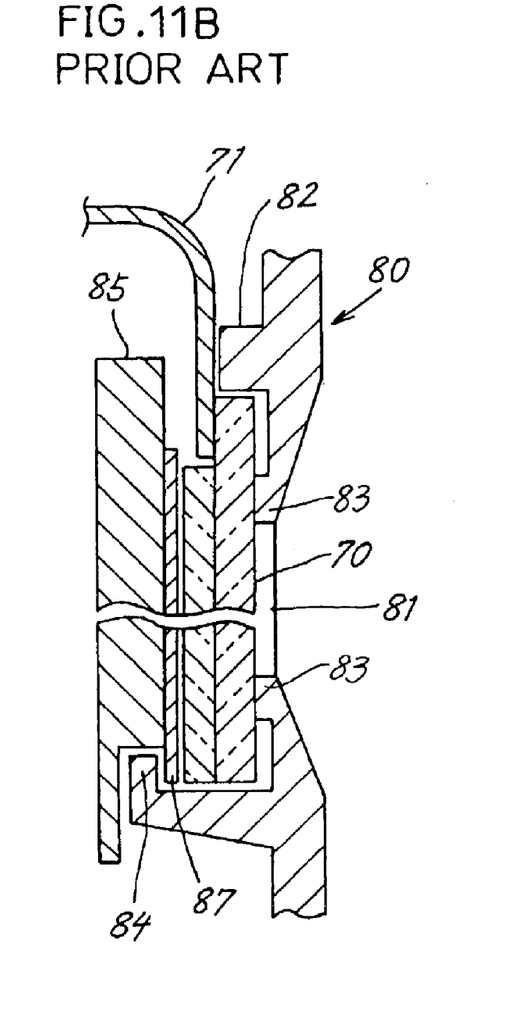
FIG. 11b shows a second conventional example.

The prior art relating to the positioning and fixing of display units will be described with reference to the camera disclosed in JP-A No. 11-149121 (1999) as an example of electronic device. FIGS. 11a and 11b are sectional views showing an LCD 70 incorporated into the camera and members around the display. By a flexible printed circuit board (hereinafter referred to as "FPC") 71, the LCD 70 is connected to a main body (not shown) having various block units and a pressure plate 85 attached thereto. An outer cover 80 attached to the main body has an opening 81 through which the LCD 70 is exposed. An EL sheet 87 is held between the LCD 70 and the pressure plate 85.

FIG. 11a shows a first example of the conventional apparatus. In assembling the camera, the LCD 70 is first dropped into a recess 86 formed in the pressure plate 85 and is thereby attached to the pressure plate 85. The outer cover 80 is then attached to the main body. At this time, the LCD 70 is positioned in place relative to the opening 81 by positioning pieces 82, 82 provided on the rear side of the cover 80. The LCD 70 is further pressed and fixed by pressure pieces 83, 83.

FIG. 11b shows a second conventional example. The outer cover 80 is provided on the rear side thereof with a second positioning piece 84 for forming a U-shaped groove, in addition to a positioning piece 82 and pressure pieces 83, 83. In assembling the camera, the LCD 70 is first fitted into a space between the positioning piece 82 and the second positioning piece 84, whereby the LCD 70 is positioned in place relative to the opening 82 of the outer cover 80. When the outer cover 80 is attached to the main body, the LCD 70 is fixed in place.

However, the display positioning mechanism of the conventional electronic device described and the procedure for assembling the mechanism have the problems to be described below.

First, the conventional mechanism fails to position the LCD 70 relative to the opening 81 with high accuracy. To fit in the LCD 70 in the conventional example, the distance between reference faces of the positioning pieces 82, 82 (FIG. 11a) or the distance between reference faces of the positioning piece 82 and the second positioning piece 84 (FIG. 11b) must be slightly greater than the vertical width of the LCD 70. This permits the LCD 70 to backlash, impairing accuracy in positioning the LCD 70. Even if high accuracy is ensured in positioning the LCD 70 relative to the pressure plate 85 and fixing the display thereto, and when the outer cover 80 is thereafter attached to the main body, it is likely that the position of the outer cover 80 relative to the main body will involve an error. The LCD 70 then becomes shifted relative to the opening 81 by an amount corresponding to the error.

Further with the first conventional example, the LCD 70 is connected in an unstable state to the main body by the FPC 71. Accordingly, even if dropped into the recess 86 formed in the pressure plate 85, the LCD 70 will be moved out of the recess 86 easily by a slight impact. Since the worker needs to handle the main body so that the LCD 70 will not be removed from the recess 86, the posture of the main body is limited during the procedure for attaching the outer cover 80, thereby resulting in a poor work efficiency.

In the case where the LCD 70 is attached to the outer cover 80 first as in the second conventional example, FPC 71 needs to have a length greater than the length thereof required for connection to the main body. The worker performs the work while holding the outer cover 80 with one hand and holding the LCD 70 with the other hand. If the FPC 71 has an increased length, the range in which the FPC 71 is movable enlarges, making the LCD 70 easy to attach. However, the camera then needs to have an enlarged space in its interior for accommodating the FPC 71. In addition, there arises a need to add to the assembling work the step of making the bent form of the FPC 71 suitable for accommodation.

SUMMARY OF THE INVENTION

An object of the present invention is to provide an electronic device having a display unit which can be positioned in place relative to an opening with ease and high accuracy and which can be thus positioned and fixed by facilitated work.

The present invention provides electronic device comprising a cabinet and a display unit to be accommodated in the cabinet, the cabinet including at least a first cabinet segment having an opening for viewing the display unit therethrough, and a second cabinet segment for the first cabinet segment to be attached thereto. The electronic device comprises a spring member provided on a rear surface of the second cabinet segment for biasing the display unit in one direction by coming into contact with a first side face of the display unit, a stopper member provided on the rear surface of the second cabinet segment for restraining the movement of the display unit by the spring member, and a positioning member projecting from a rear surface of the first cabinet segment and provided with a reference face for a second side face of the display unit to come into contact with, the display unit being holdable between the spring member and the positioning member when the first cabinet segment is attached to the second cabinet segment. The display unit or the positioning member is provided with a guide for moving the display unit as held between the spring member and the stopper member against the biasing force of the spring member until the second side face of the display unit comes into contact with the reference face when the first cabinet segment is attached to the second cabinet segment.

The present invention further provides an electronic device comprising a cabinet, and a holder and a display unit to be accommodated in the cabinet, the cabinet including at least a first cabinet segment having an opening for viewing the display unit therethrough, and a second cabinet segment to be attached to the first cabinet segment or to the holder. The electronic device comprises a first spring member provided on the holder for biasing the display unit in one direction by coming into contact with a first side face of the display unit, a first stopper member provided on the holder for restraining the movement of the display unit by the spring member, and a first positioning member projecting from a rear surface of the first cabinet segment and provided with a reference face to be brought into contact with a second side face of the display unit, the display unit being holdable between the first spring member and the first positioning member when the first cabinet segment is attached to the second cabinet segment. The display unit or the first positioning member being provided with a first guide for moving the display unit as held between the first spring member and the first stopper member against the biasing force of the first spring member until the side face of the display unit comes into contact with the reference face when the first cabinet segment is attached to the second cabinet segment or to the holder.

In assembling the electronic device described above, the display unit is held between the spring member and the stopper member, whereby the display unit can be readily mounted on or temporarily held to the rear surface of the first cabinet segment or the holder. The display unit, which is temporarily held, will not be removed even if the first cabinet segment or holder should be altered in posture or subjected to an impact. The electronic device can therefore be assembled efficiently. Furthermore, there is no need to use an FPC or lead wires which are made longer than necessary in order to render the display unit easily mountable.

Further with the construction described above, the display unit can be positioned in place relative to the opening with high accuracy as will be described below.

In attaching the first cabinet segment to the second cabinet segment or to the holder after temporarily fixing the display unit, the guide provided on the display unit or on the positioning member moves the display unit as held between the spring member and the stopper member in a direction opposite to the direction of biasing force of the spring member. Accordingly, if the display unit is temporarily held as slightly shifted toward the direction of biasing force of the spring from the position predetermined for the completion of assembling the electronic device, the display unit is moved toward the predetermined position when the first cabinet segment is attached to the second segment.

The positioning member projecting from the rear surface of the first cabinet segment has a reference face to be brought into contact with one side face of the display unit, and the guide moves the display unit until the side face of the display unit comes into contact with the reference face. Consequently, when the first cabinet segment is attached to the second cabinet segment or to the holder, the positioning member and the spring member hold the display unit therebetween. The positioning member can be disposed easily for the opening with high accuracy, by, for example, molding the positioning member integrally with the first cabinet segment. According to the invention, therefore, the display unit can be positioned for the opening with high accuracy with reference to the positioning member by merely attaching the first cabinet segment to the second cabinet segment or to the holder after temporarily fixing the display unit.

The guide of the invention may be a guide face sloping from an outer end of the positioning member toward the opening. In attaching the first cabinet segment to the second segment or to the holder, a corner of the display unit first comes into contact with the guide face. When the first segment is moved toward the second segment or to the holder, the corner of the display unit slidingly moves on the guide face to move the display unit against the biasing force of the spring member. Upon completion of this movement, the side face of the display unit is brought into bearing contact with the reference face of the positioning member.

The guide of the invention may be a guide face formed between the front surface of the display unit and the side face thereof and sloping from the front surface of the display unit rearwardly and outwardly of the display unit. In attaching the first segment to the second segment or to the holder, an end portion of the positioning member first comes into contact with the guide face. When the first segment is moved toward the second segment or the holder, the end portion slidingly moves on the guide face to move the display unit against the biasing force of the spring member. On completion of this movement, the side face of the display unit is brought into bearing contact with the reference face of the positioning member.

When the first cabinet segment is provided with a pressure member projecting from the rear surface thereof for pressing the front surface of the display unit, the display unit is held between the second segment or the holder and the pressure member and fixed in place with improved stability. A transparent plate closing the opening may be used as the pressure member for protecting the display unit.

Two spring members may be provided for biasing the display unit in different directions, in combination with stopper members, positioning members and guides corresponding to these respective spring members. Preferably, the biasing directions of the spring members are approximately orthogonal to each other. The display unit can then be positioned in place relative to the opening more reliably.

BRIEF DESCRIPTION OF THE DRAWINGS

FIGS. 6a to 6c are sectional views for illustrating a process for positioning the display unit;

FIG. 9b shows another embodiment which is an improvement of the embodiment shown in FIG. 9a;

DETAILED DESCRIPTION OF THE INVENTION

An embodiment of the invention, i.e., a digital still camera (hereinafter referred to merely as a "camera"), will be described in detail with reference to the drawings.

Figure 1:
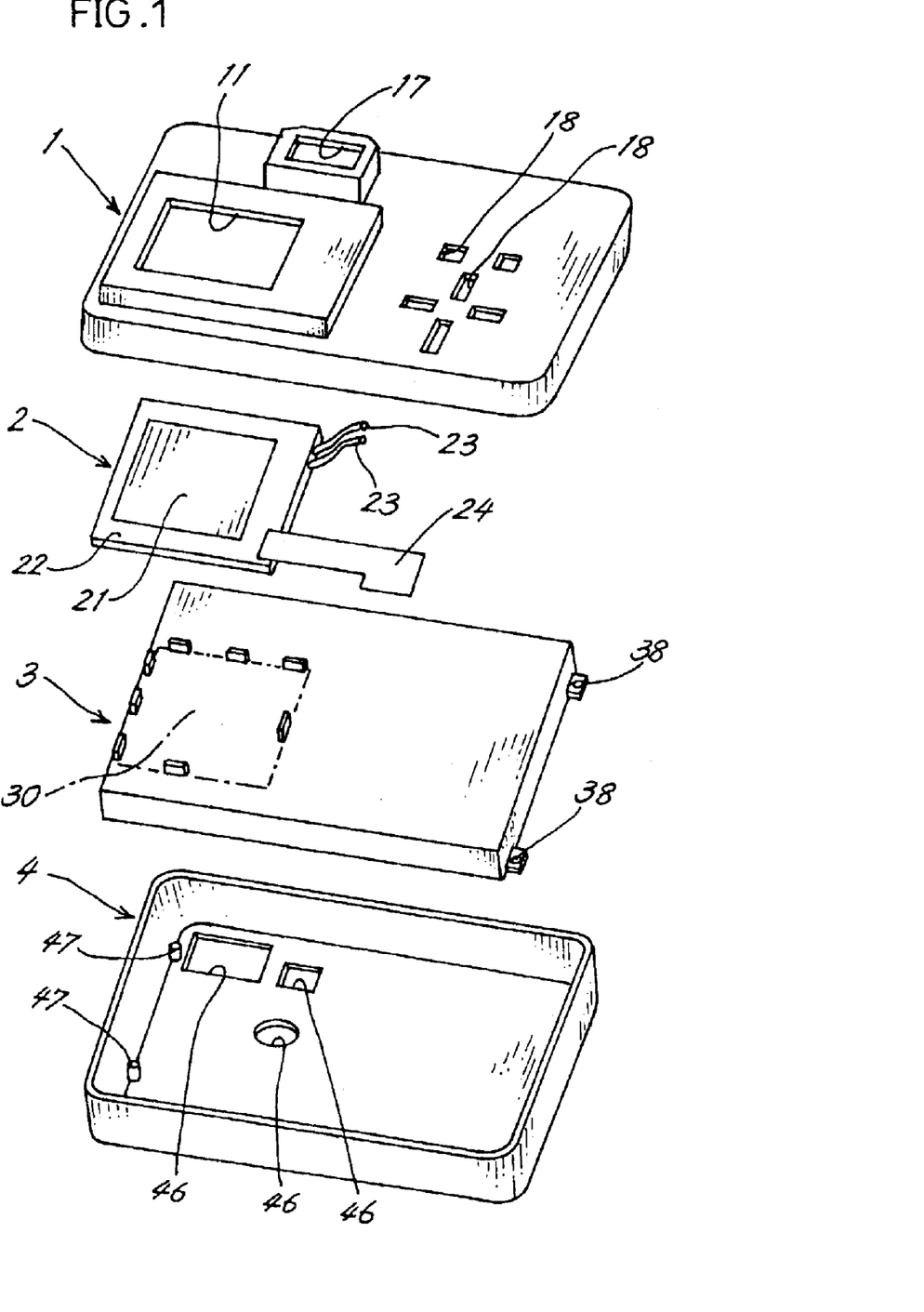
FIG. 1 is an exploded perspective view of a camera according to the invention.

FIG. 1 is an exploded perspective view of the camera. The camera has a cabinet, which comprises a first cabinet segment 1 positioned on the rear side of the camera, and a second cabinet segment 4 positioned toward a photographic lens, i.e., on the camera front side. Disposed on the rear side of the second cabinet segment 4 is a holder 3 provided with interior devices (such as, an image pickup unit including the lens and a CCD device, an electronic flash unit (these units are not shown), etc.). A display unit 2 is attached also to the holder 3. When the first cabinet segment 1 is attached to the second cabinet segment 4, the display unit 2 can be seen through an opening 11 formed in the first cabinet segment 1. Although not shown, the second cabinet segment 4 is provided with means (such as a guide mechanism and screw holes) by which the first cabinet segment 1 is positioned and fixed in place.

The second cabinet segment 4 is provided with a plurality of openings 46 for exposing therethrough the lens of the image pickup unit, light-emitting portion of the electronic flash unit, etc. Each of the projections 47 provided on the rear side of the second cabinet segment 4 has a screw hole for a screw to be screwed in for fixing the holder 3.

The display unit 2 has a display panel assembly 21 including a liquid crystal panel and an EL sheet, a frame 22 provided with an opening 21 for exposing the display unit 2 therethrough, and lead wires 23 and an FPC 24 extending outward through the frame 22. The lead wires 23 supply drive power to the display panel assembly 21 therethrough, and the FPC 24 transmits image data signals, panel control signals, etc. to the assembly 21 therethrough. Although the frame 22 is not always necessary, the frame 22, if used, gives the display unit 2 a surface contour suitable to the invention, protecting the panel assembly 21 from an impact when the display unit 2 is attached.

Figure 2A:
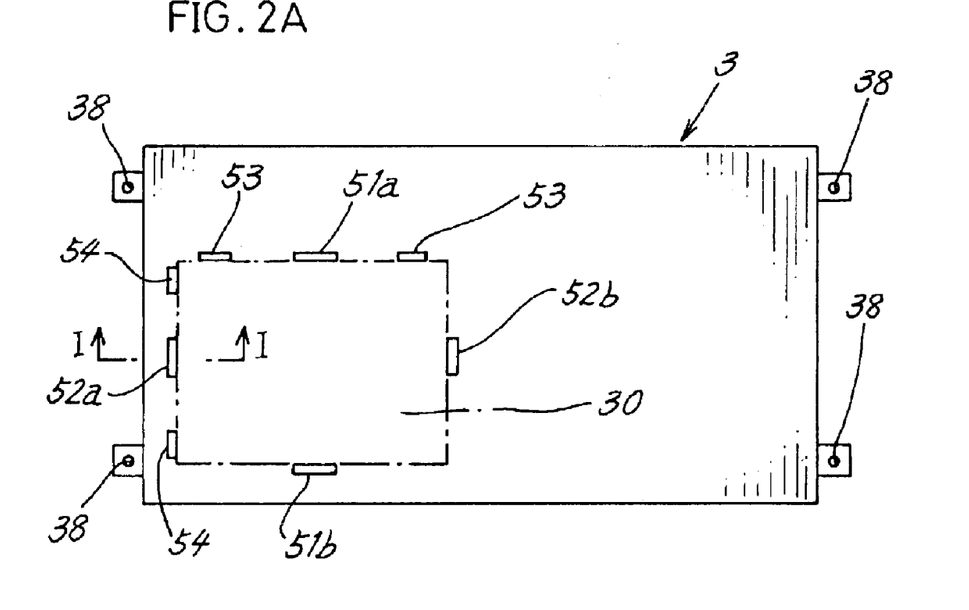
FIG. 2a is a plan view of a holder.

With reference to FIG. 2a, each of the projecting pieces provided at corners of the holder 3 has a hole 38 corresponding to the screw hole formed in the projection 47 of the second cabinet segment 4. The holder 3 can be fixed to the second cabinet segment 4 by inserting each fixing screw through the hole 38 of the holder 3 and screwing the screw into the screw hole of the projection 47. The display unit 2 is mounted on a planar portion 30 of the holder 3. Although not shown in detail, the holder 3 further has a curved portion for mounting a cell, a recessed portion for mounting a circuit board, a cutout and frame portion for mounting a finder assembly, etc.

Figure 2B:
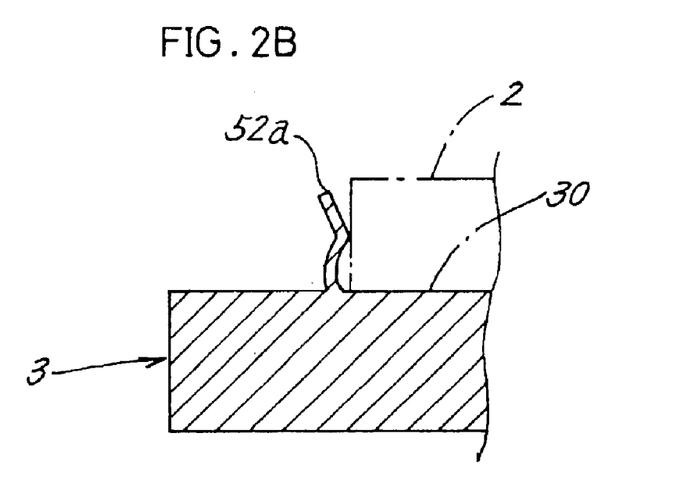
FIG. 2b is an enlarged view in section taken along a plane containing the line I—I in FIG. 2a and showing a second spring member and the vicinity thereof.

The holder 3 is provided with members for attaching the display unit 2. First, the holder 3 has plate spring members 51a, 52a projecting from the surface thereof. These members are a first spring member 51a to be in bearing contact with an upper side face of the display unit 2 for biasing the unit 2 from the upper side of the camera toward the lower side thereof (from above downward in FIG. 2a), and a second spring member 52a to be in bearing contact with the left side face of the display unit 2 for biasing the unit 2 from the left side of the camera rightward (from left toward right in FIG. 2a). FIG. 2b is a view a in section taken along a plane containing the line I—I in FIG. 2a and showing the second spring member 52a and the vicinity thereof. Each of the first spring member 51a and the second spring member 52a has a bent portion projecting toward the display unit 2. The bent portion has a guide face inclined with respect to the planar portion 30 so that the display unit 2 can be readily mounted on the planar portion 30.

The planar portion 30 has at its lower end a first stopper member 51b projecting therefrom and opposed to the first spring member 51a for restraining the display unit 2 from moving downward. Opposed to the second spring member 52a is a second stopper member 52b projecting from the right end of the planar portion 30 for restraining the unit 2 from moving rightward. Further provided at opposite sides of the first spring member 51a are third stopper members 53, 53 for restraining the unit 2 from moving upward, and at opposite sides of the second spring member 52a are fourth stopper members 54, 54 for restraining the unit 2 from moving leftward. The third and fourth stopper members 53, 53, 54, 54 are members for assisting the display unit 2 to be attached to the planar portion and are not always necessary. However, if used, these members make it possible to position the display unit 2 in place more easily when the unit 2 is to be mounted on the planar portion 30, thereby permitting the holder 3 to hold the unit 2 with higher stability.

For the first spring member 51a and the first stopper member 51b to hold the display unit 2 therebetween, the distance between the projecting end of the bent portion of the member 51a and the face of the stopper member 51b which face is positioned toward the planar portion 30 is made slightly smaller than the vertical width of the rectangular display unit 2. Similarly, the distance between the projecting end of the bent portion of the second spring member 52a and the face of the second stopper member 52b which face is positioned toward the planar portion 30 is made slightly smaller than the horizontal width of the display unit 2.

Figure 3:
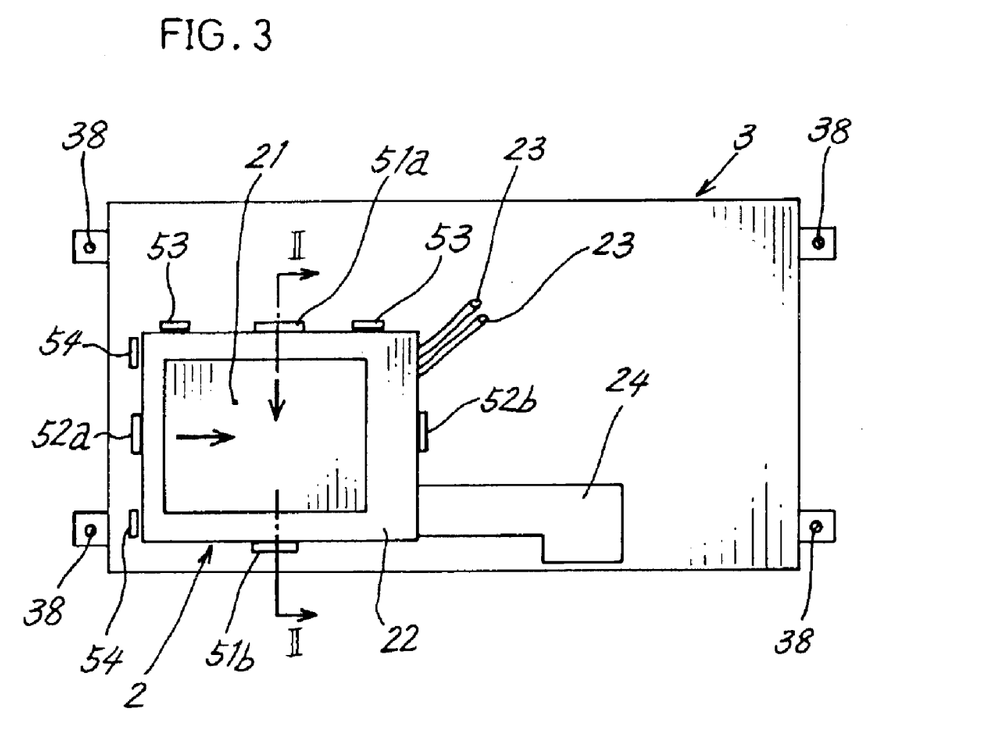
FIG. 3 is a plan view showing a display unit as mounted on a planar portion of a holder.

FIG. 3 is a plan view showing the display unit 2 as mounted on the planar portion 30 of the holder 3. The first spring member 51a and the second spring member 52a bias the display unit 2 downward and rightward, respectively (i.e., in the directions indicated by respective arrows in FIG. 3). The lower side face and the right side face of the display unit 2 are in bearing contact with the first and second stopper members 51b, 52b, respectively. The spring members 51a, 52a and the stopper members 51b, 52b are so arranged on the surface of the holder 3 that the display unit 2 as mounted on the holder 3 is positioned as slightly shifted rightward and downward from the specified position thereof when the camera is completed. The third and fourth stopper members 53, 53, 54, 54 are so arranged that a slight clearance will be provided between these members and the upper side face and the left side face of the display unit 2 as mounted on the holder 3.

In assembling the camera, the holder 3 is attached to the second cabinet segment 4, and the display unit 2 is thereafter mounted on the holder 3. Conversely, the display unit 2 is mounted on the holder 3 first, and the holder 2 is then attached to the second cabinet segment 4. After the display unit 2 is mounted on the planar portion 30, the lead wires 23 and the FPC 24 of the unit 2 are connected to the circuit board (not shown) mounted on the holder 3.

Figure 4A:
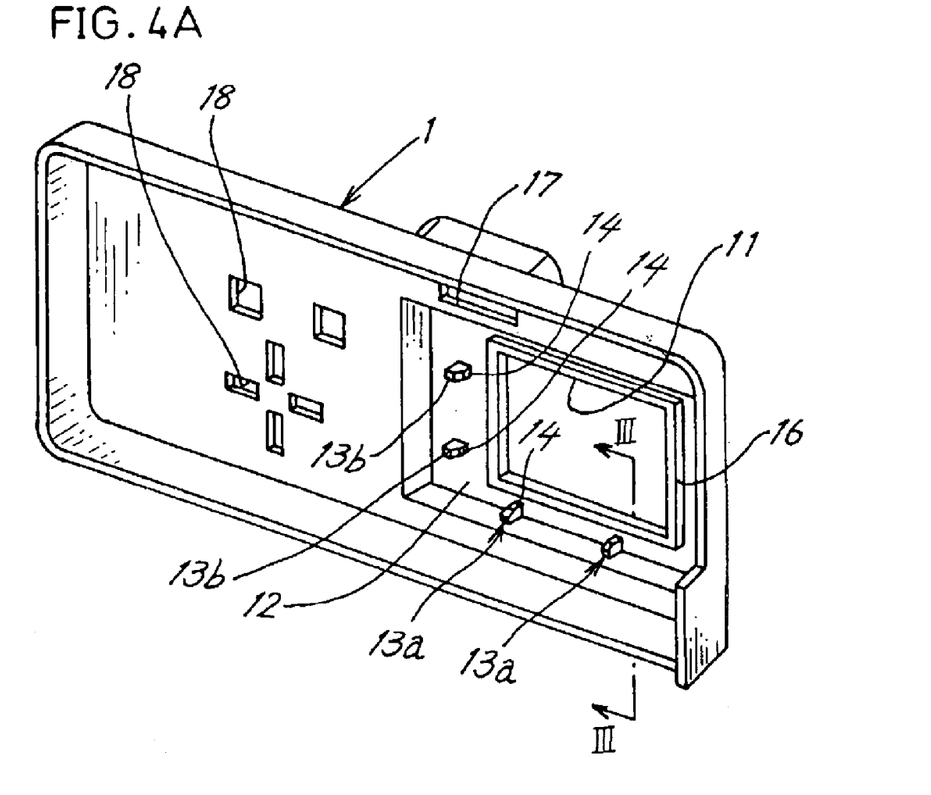
FIG. 4a is a perspective view of a first cabinet segment as it is seen from the rear side thereof.

FIG. 4a is a perspective view of the first cabinet segment 1 as it is seen from the rear side thereof. The segment 1 provides the rear wall of the camera and portions of side walls thereof. The segment portion corresponding to the rear wall of the camera has an opening 11 for exposing the display unit 2 therethrough, an opening 17 for mounting the finder assembly, and openings 18 for inserting a button and switch therethrough. Formed around the opening 11 is a recess 12 for accommodating the unit 2 and a framelike pressure member 16 surrounding the opening 11. Projecting from the segment 1 outside the pressure member 16 are two first positioning members 13a, 13a under the opening 11 and two second positioning members 13b, 13b at the left side of the opening 11. These first and second positioning members 13a, 13a, and 13b, 13b are so arranged as to be positioned respectively in the vicinity of the first stopper member 51b and in the vicinity of the second stopper member 52b when the first cabinet segment 1 is attached to the second cabinet segment 4.

Figure 4B:
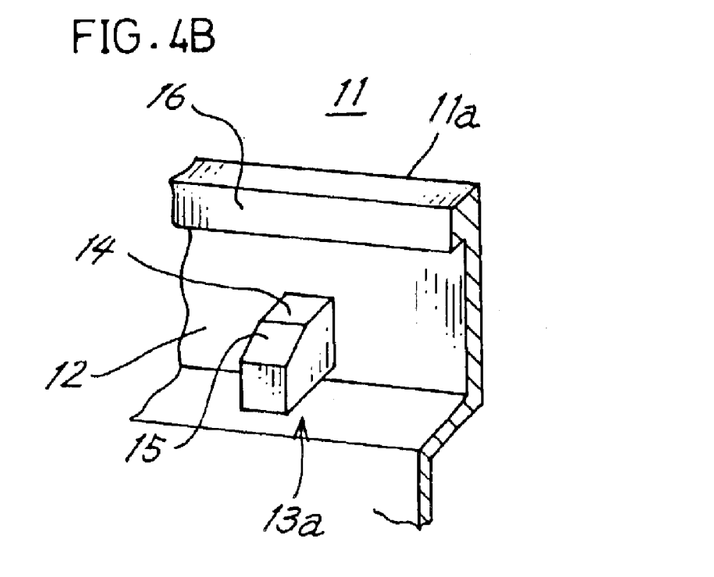
FIG. 4b is an enlarged view of a first positioning member.

FIG. 4b is an enlarged view partly broken away along a plane containing the line III—III in FIG. 4a and showing the first positioning member 13a and the vicinity thereof. The first positioning member 13a has a reference face 14 parallel to an edge 11a of the opening and perpendicular to the bottom wall of the recess 12. The member 13a further has guide face 15 formed between the reference face and the outer end of the member 13a and sloping from the outer end of the member 13a toward the opening 11. When the first cabinet segment 1 is attached to the second cabinet segment 4, the display unit 2 as held between the first spring member 51a and the first stopper member 51b is moved by the guide face 15 against the biasing force of the first spring member 51a. As a result, the lower side face of the display unit 2 comes into bearing contact with the reference face 14, and the unit 2 is held between the reference face 14 and the first spring member 51a. The second positioning member 13b has the same shape as the first positioning member 13a, and is so positioned as to correspond to the member 13a as rotated clockwise through 90 deg. Each second positioning member 13b acts like the first positioning member 13a and comes into contact with the right side face of the display unit 2 to hold the unit 2 along with the second spring member 52a.

The opening 11 and the first and second positioning members 13a, 13b are formed simultaneously when the first cabinet segment 1 is molded. The first and second positioning members 13a, 13b are positioned relative to the opening 11 as predetermined with high accuracy. Accordingly, when the lower side face and the right side face of the display unit 2 come into contact with the respective reference faces 14 of the first positioning members 13a, 13a and the second positioning members 13b, 13b, the display unit 2 is positioned in place relative to the opening 11 with high accuracy.

Figure 5:
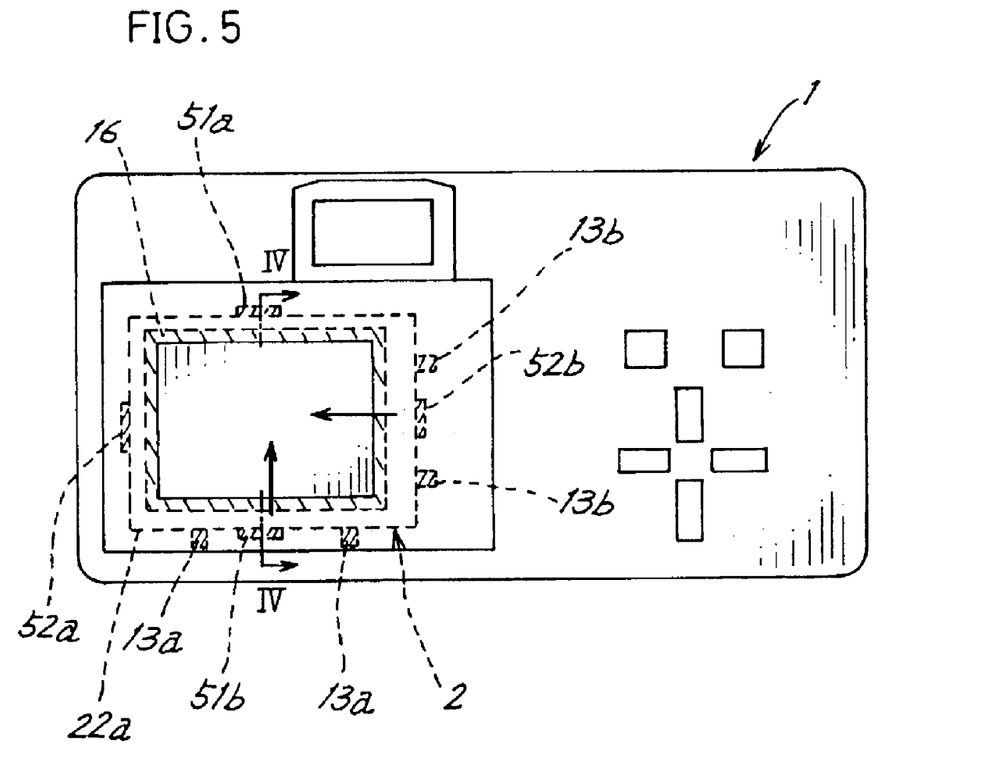
FIG. 5 is a plan view showing the first cabinet segment as attached to a second cabinet segment.
Figure 6A:
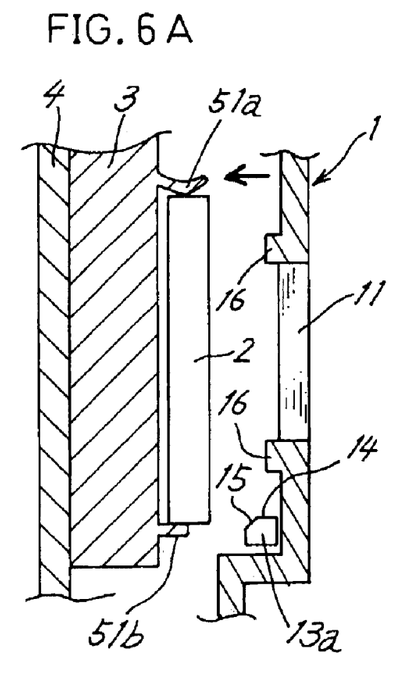
FIG. 6a is a view in section taken along a plane containing the line II—II in FIG. 3 and showing the camera.
Figure 6B:
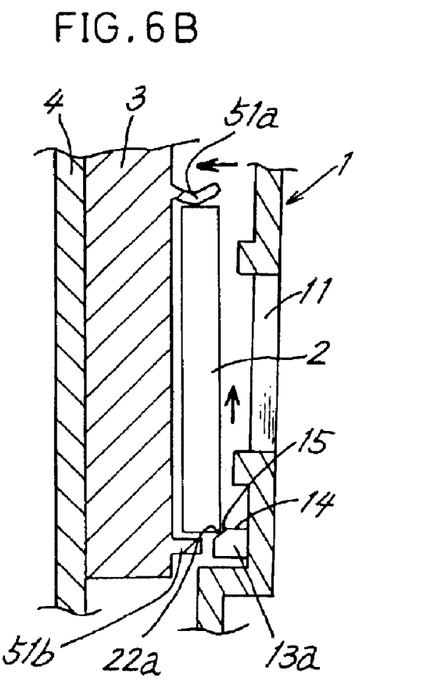
FIG. 6b is a sectional view showing the first and second cabinet segments while they are being fitted to each other.
Figure 6C:
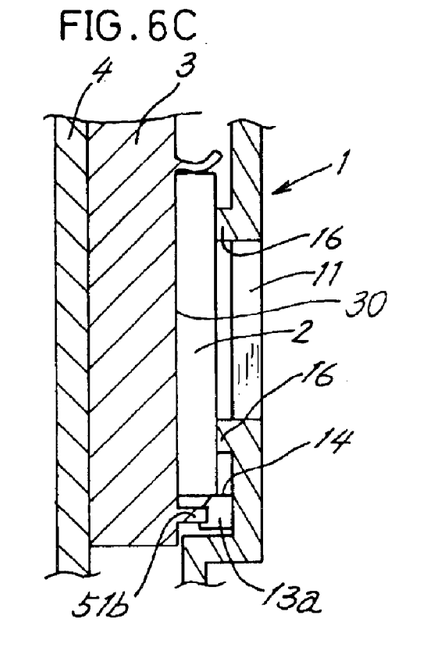
FIG. 6c is a view in section taken along a plane containing the line IV—IV in FIG. 5 and showing the camera.

In assembling the camera, the holder 3 is temporarily fixed to the second cabinet segment 4, the display unit 2 is then mounted on the planar portion 30 of the holder 3 (or the display unit 2 is mounted on the planar portion 30, the holder 2 is then fixed to the second cabinet segment 4), and the first cabinet segment 1 is thereafter attached to the second cabinet segment 4. FIG. 5 is a plan view showing the first cabinet segment 1 as attached to the second cabinet segment 4. FIG. 6a is a view for illustrating a process for positioning and fixing the display unit 2. FIG. 6a is a view in section taken along a plane containing the line II—II in FIG. 3 and showing the display unit 2 and the vicinity thereof, i.e., the first cabinet segment 1 and the second cabinet segment 4 before they are fitted to each other. FIG. 6b shows these segments while they are being fitted together. FIG. 6c is a view in section taken along the line IV—IV in FIG. 5 and showing the segments as completely fitted together.

The display unit 2 is first mounted on the planar portion 30 of the holder 3 (FIG. 6a). The unit 2 in this state is held by the spring members 51a, 52a and the stopper members 51b, 52b, with a small clearance provided between the rear wall of the display unit 2 and the planar portion 30. The worker positions the first cabinet segment 1 in place relative to the second cabinet segment 4 and presses the segment 1 against the segment 4, whereby the guide faces 15 of the positioning members 13a are brought into contact with the corner 22a of the frame 22 of the unit 2, and the unit 2 is pushed from the right side and the lower side. (The directions in which the unit 2 is pushed are indicated by arrows in FIG. 5.) The unit 2 is moved away from the first stopper 51b toward the reference faces 14 against the biasing force of the spring member 51a by the corner 22a of the frame 22 being pushed by the guide faces 15 as seen in FIG. 6b.

When the display unit 2 is supported by the reference faces 14 of the first positioning members 13a after the corner 22a of the frame 22 is moved over the guide faces 15, the unit 2 is positioned in place relative to the opening 11 as seen in FIG. 5 and FIG. 6c. The display unit 2 is supported by the first spring member 51a and the first positioning members 13a as shown in FIG. 6c. It will be readily understood that the unit 2 is similarly held by the second spring member 52a and the second positioning members 13b. When the display unit 2 is pressed on its front surface by the pressure member 16, the unit 2 is held between the planar portion 30 of the holder 3 and the pressure member 16. The first cabinet segment 1 is finally fixed to the second cabinet segment 4 with screws or the like.

Figure 10A:
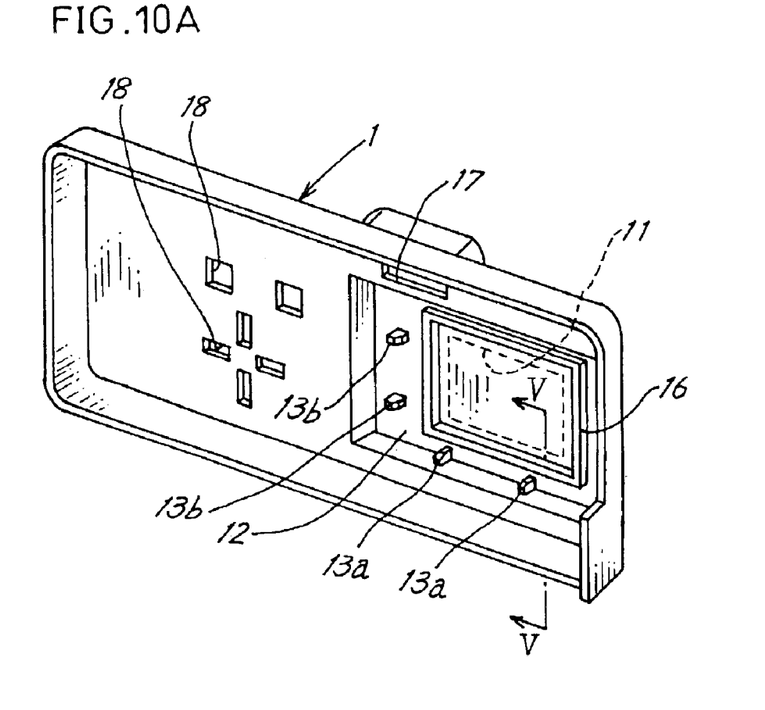
FIG. 10a is a perspective view of a first cabinet segment wherein a glass plate is used as a pressure member and which is seen from the rear side thereof.
Figure 10B:
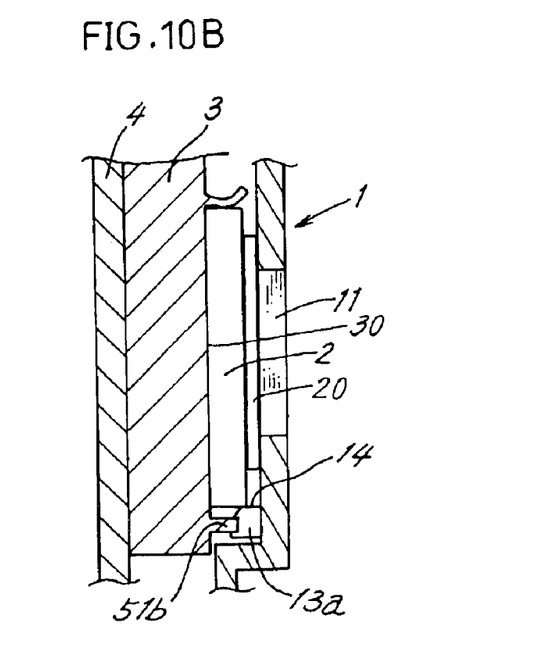
FIG. 10b is a view in section taken along a plane containing the line V—V in FIG. 10a and showing the camera after the first cabinet segment is attached to FIGS. 11a and 11b are sectional views of an LCD of a conventional camera and members around the display.

A glass plate or like transparent plate 20 may be used as the pressure member. As shown in FIG. 10a, the transparent plate 20 substituting for the pressure member 16 is joined to the rear side of the first cabinet segment 1 to close the opening 11. When the first cabinet segment 1 is attached to the segment 4, the display unit 2 is held between the holder 3 and the transparent plate 20 as shown in FIG. 10b. The display unit 2 can be seen through the opening 11 and the transparent plate 20. When the transparent plate 20 is used, the display unit 2 can be protected from the impact to be exerted thereon from outside the camera.

Figure 7A:
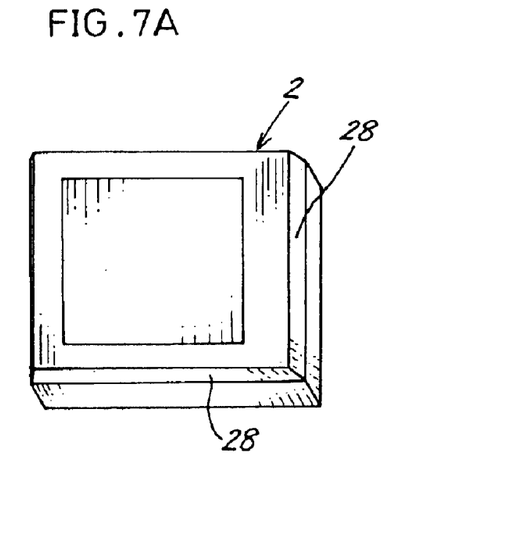
FIG. 7a is a perspective view of a display unit provided with guide faces.
Figure 7B:
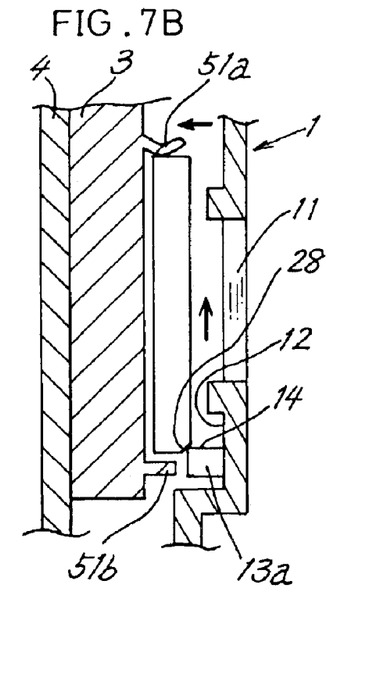
FIG. 7b is a sectional view showing the first and second cabinet segments while they are being fitted to each other in the case where this display unit is used.

The display unit 2 may be provided with guide means in place of the positioning members 13a, 13b for moving the unit 2 against the spring members 51a, 52a. FIG. 7a shows a display unit 2 which is provided at the right end and lower end thereof with respective guide faces 28, 28 sloping from the front surface of the display unit 2 rearward and outward. FIG. 7b shows this embodiment while the first cabinet segment 1 is being attached to the second cabinet segment 4. The segment 1 has a first positioning member 13a which is in the form of a prism and is not provided with the guide face 15 shown in FIG. 4b. The positioning member 13a has a reference face 14 extending from the bottom of the recess 12 to the outer end of the member 13a. When the first cabinet segment 1 is pressed against the second cabinet segment 4, the outer end of the first positioning member 13a pushes the guide face 28, whereby the unit 2 is moved upward against the biasing force of the first spring member 51a. Although not shown, the segment 1 has a second positioning member 13b which also has the same shape as the first positioning member 13a, such that the display unit 2 moves rightward against the biasing force of the second spring member 52a.

Figure 8A:
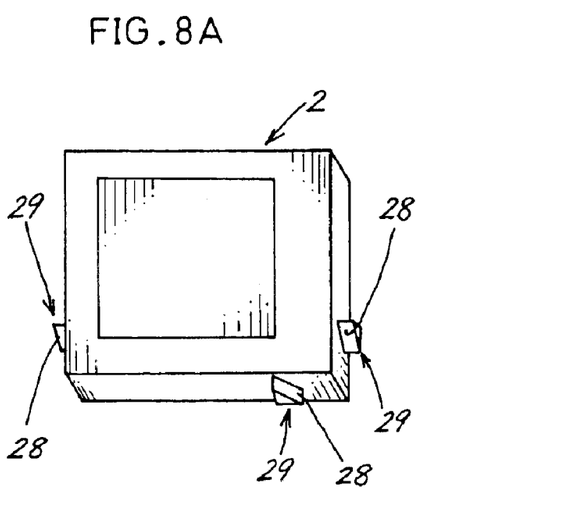
FIG. 8a is a perspective view of a display unit provided with guide members.
Figure 8B:
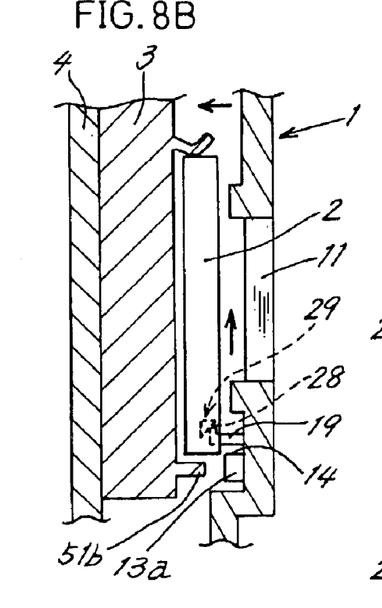
FIG. 8b is a sectional view showing the first and second cabinet segments while they are being fitted to each other in the case where this display unit is used.

As shown in FIGS. 8a and 8b, guide members 29 each having a guide face 28 may be provided on side faces of the frame 22 of a display unit 2, with followers 19 provided on the rear side of the first cabinet segment 1 in corresponding relation with the respective guide faces 28. FIG. 8b is a sectional view showing this embodiment while the first cabinet segment 1 is being attached to the segment 4. When the segment 1 is brought closer to the segment 4, each follower 19 pushes the guide face 28, pushing up the unit 2 from the first stopper member 51b against the force of the first spring member 51a. Upon the follower 19 moving over the guide face 28, the lower side face of the display unit 2 comes into contact with the reference face 14 of the positioning member 13a to position and hold the unit 2 in place. Similarly, the unit is moved rightward against the force of the spring member 52a and is thereby positioned and held in place.

Thus, the display unit 2 can be positioned relative to the opening 11 with high accuracy according to the present invention merely by attaching the first cabinet segment 1 to the second cabinet segment 4, with the display unit 2 mounted on the holder 3. Although the display unit 2 is positioned at the left lower portion of rear side of the camera according to the embodiments described, the position of the unit 2 is not limited specifically in the case of the invention. The direction in which the spring members 51a, 52a exert a biasing force is not limited only to the rightward or downward direction shown in FIG. 3.

The device to which the present invention is applicable may have a plurality of cabinets, with the display unit 2 provided on one of the cabinets. In the case where the holder 3 need not be provided, the spring members 51a, 52a and stopper members 51b, 52b may be provided on the second cabinet segment 4. Furthermore, the component to which the first cabinet segment 1 is to be attached need not always be the second segment 4 but can be the holder 3.

Figure 9A:
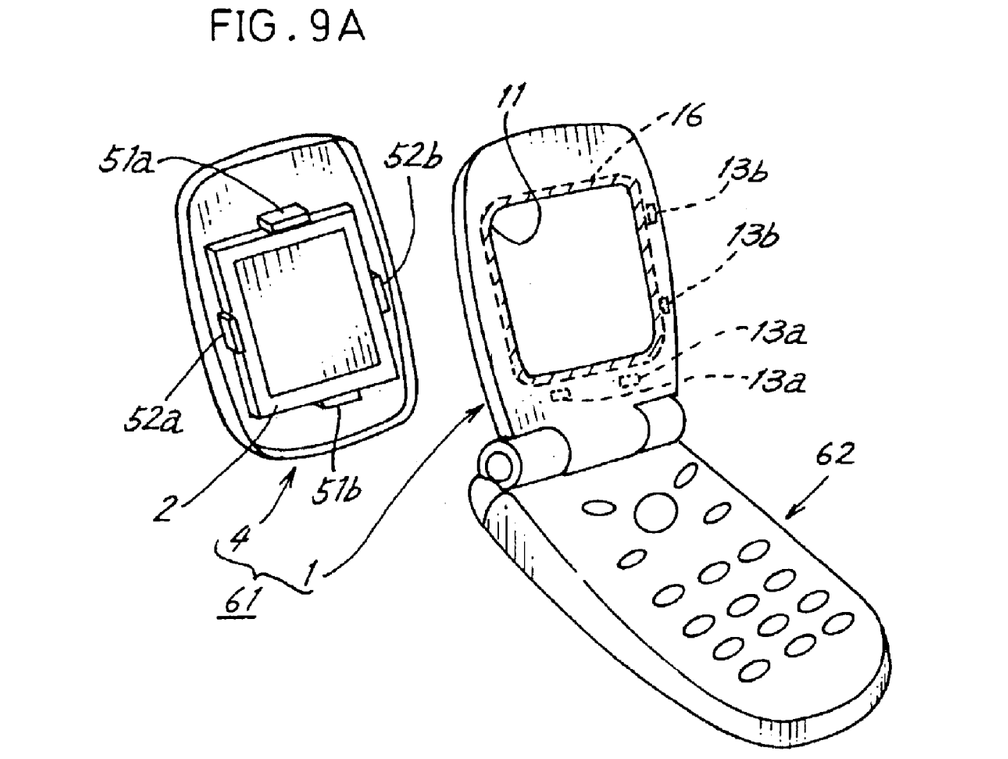
FIG. 9a is an exploded perspective view of a portable telephone of the invention.

FIG. 9a is an exploded perspective view of an embodiment wherein the present invention is applied to a cellular phone, i.e., to a portable telephone. This portable telephone has two cabinets, i.e., a first cabinet 61 and a second cabinet 62. The second cabinet 62 is internally provided with an interior device required for transmitting and receiving signals, while the first cabinet 61 has a display unit 2 accommodated therein. The first cabinet 61 comprises a first cabinet segment 1 and a second cabinet segment 4. The first cabinet segment 1 is hinged to the second cabinet 62. Provided on the rear surface of the second cabinet segment 4 are spring members 51a, 52a and stopper members 51b, 52b, and the display unit 2 is held by these members. The first cabinet segment 1 has positioning members 13a, 13b and a pressure member 16 projecting from the rear surface thereof around an opening 11. The second cabinet segment 4 is attached to the first cabinet segment 1, whereby the display unit 2 is accurately positioned relative to the opening 11 and fixed in place as in the foregoing embodiments.

Figure 9B:
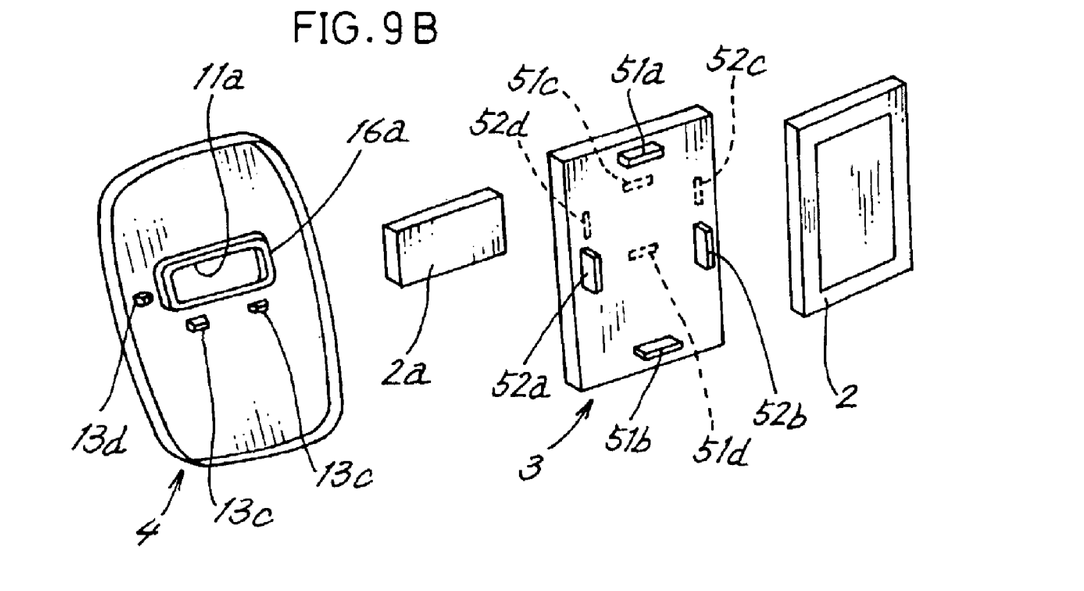

The embodiment of FIG. 9a may be so improved that an exposed display unit 2a is provided on the second cabinet segment 4 in addition to the display unit 2 as seen in FIG. 9b. The first cabinet segment 1 and the second cabinet 62 are not shown in FIG. 9b. The portable telephone has the display unit 2 exposed from the opening 11 formed in the first cabinet segment 1 and the small display unit 2a exposed from an opening 11a formed in the second cabinet segment 4. A holder 3 in the form of a plate and facing the first cabinet segment 1 has spring members 51a, 52a and stopper members 51b, 52b projecting from a surface thereof for mounting the display unit 2 thereon. Furthermore, the holder surface to be opposed to the second cabinet segment 4 has projecting therefrom spring members 51c, 52c and stopper members 51d, 52d for mounting the display unit 2a thereon. The second cabinet segment 4 has a pressure member 16 projecting therefrom around the opening 11a, and positioning members 13c, 13d projecting therefrom outside the pressure member 16a in corresponding relation with the spring members 51c, 52c.

When the second cabinet segment 4 is attached to one surface of the holder 3, with the display unit 2a mounted on the holder 3, the display unit 2a is positioned for the opening 11a and fixed in place as in the foregoing embodiments. The display unit 2 is thereafter mounted on the other surface of the holder 3. The components are subsequently assembled in the same manner as described. Such an electronic device wherein a plurality of display units are visible through respective corresponding cabinet openings can also be assembled easily according to the invention, with the display units mounted in place relative to the respective openings with high accuracy.

Used in any of the foregoing embodiments are two kinds of spring members 51a, 52a for biasing the display unit 2 in different directions. In the case where the display unit 2 is satisfactory in dimensional accuracy, only one of the first and second spring members 51a, 52a may be provided in combination with only one of the first and second positioning members 13a, 13b in corresponding relation.

The cabinet of the electronic device comprises a first cabinet segment 1 and a second cabinet segment 4 according to some of the foregoing embodiments, whereas the cabinet of the electronic device need not always comprise two divided segments. For example, in the embodiment shown in FIG. 1, the first cabinet segment 1 may comprise two divided portions, i.e., a portion including the opening 11 and the other portion. It will be apparent that the display device 2 can then be positioned accurately relative to the opening 11 as described above. Although the display units 2, 2a in the foregoing embodiments are rectangular in shape, the shape of the display unit is not limited particularly according to the present invention.

The embodiments described above are intended to illustrate the present invention and should not be construed as limiting the invention set forth in the appended claims or reducing the scope thereof. The device of the invention is not limited to the above embodiments in construction but can of course be modified variously within the technical scope defined in the claims.

What is claimed is:

1. An electronic device having a cabinet and a display unit to be accommodated in the cabinet, the cabinet including at least a first cabinet segment having an opening for viewing the display unit therethrough, and a second cabinet segment for the first cabinet segment to be attached thereto, the electronic device comprising:
   a first spring member provided on a rear surface of the second cabinet segment for biasing the display unit in one direction by coming into contact with a first side face of the display unit;
   a first stopper member provided on the rear surface of the second cabinet segment for restraining the movement of the display unit by the spring member; and
   a first positioning member projecting from a rear surface of the first cabinet segment and provided with a reference face for a second side face of the display unit to come into contact with, the display unit being holdable between the first spring member and the first positioning member when the first cabinet segment is attached to the second cabinet segment,
   the display unit or the first positioning member being provided with a first guide for moving the display unit as held between the first spring member and the first stopper member against the biasing force of the first spring member until the second side face of the display unit comes into contact with the reference face when the first cabinet segment is attached to the second cabinet segment.

2. An electronic device according to claim 1, wherein the first guide is a guide face sloping from an outer end of the first positioning member toward the opening.

3. An electronic device according to claim 1, wherein the first guide is a guide face formed between a front surface of the display unit and the second side face thereof and sloping from the front surface of the display unit rearwardly and outwardly of the display unit.

4. An electronic device according to claim 1, wherein the first cabinet segment has a pressure member projecting from the rear surface thereof for pressing on a front surface of the display unit.

5. An electronic device according to claim 4, wherein the pressure member is a transparent plate closing the opening.

6. An electronic device according to claim 1, further comprising: comprises:
   a second spring member provided on the rear surface of the second cabinet segment for biasing the display unit in a direction different from said one direction by coming into contact with a third side face of the display unit;
   a second stopper member provided on the rear surface of the second cabinet segment for restraining the movement of the display unit by the second spring member; and
   a second positioning member projecting from the rear surface of the first cabinet segment and provided with a reference face for a fourth side face of the display unit to come into contact with, the display unit being holdable between the second spring member and the second positioning member when the first cabinet segment is attached to the second cabinet segment,
   the display unit or the second positioning member being provided with a second guide for moving the display unit as held between the second spring member and the second stopper member against the biasing force of the second spring member until the fourth side face of the display unit comes into contact with the reference face when the first cabinet segment is attached to the second cabinet segment.

7. An electronic device according to claim 6, wherein the direction in which the display unit is biased by the second spring member is approximately orthogonal to the direction in which the display unit is biased by the first spring member.

8. An electronic device according to claim 6, wherein the first guide is a guide face sloping from an outer end of the first positioning member toward the opening, and the second guide is a guide face sloping from an outer end of the second positioning member toward the opening.

9. An electronic device according to claim 6, wherein the first guide is a guide face formed between a front surface of the display unit and the second side face thereof and sloping from the front surface of the display unit rearwardly and outwardly of the display unit, and the second guide is a guide face formed between the front surface of the display unit and the fourth side face thereof and sloping from the front surface of the display unit rearwardly and outwardly of the display unit.

10. An electronic device according to claim 6, wherein the first cabinet segment has a pressure member projecting from the rear surface thereof for pressing on a front surface of the display unit.

11. An electronic device according to claim 10, wherein the pressure member is a transparent plate closing the opening.

12. An electronic device having a cabinet, and a holder and a display unit to be accommodated in the cabinet, the cabinet including at least a first cabinet segment having an opening for viewing the display unit therethrough, and a second cabinet segment to be attached to the first cabinet segment or to the holder, the electronic device comprising:
   a first spring member provided on the holder for biasing the display unit in one direction by coming into contact with a first side face of the display unit;
   a first stopper member provided on the holder for restraining the movement of the display unit by the first spring member; and
   a first positioning member projecting from a rear surface of the first cabinet segment and provided with a reference face to be brought into contact with a second side face of the display unit, the display unit being holdable between the first spring member and the first positioning member when the first cabinet segment is attached to the second cabinet segment,
   the display unit or the first positioning member being provided with a first guide for moving the display unit as held between the first spring member and the first stopper member against the biasing force of the first spring member until the side face of the display unit comes into contact with the reference face when the first cabinet segment is attached to the second cabinet segment or to the holder.

13. An electronic device according to claim 12, wherein the first guide is a guide face sloping from an outer end of the first positioning member toward the opening.

14. An electronic device according to claim 12, wherein the first guide is a guide face formed between a front surface of the display unit and the second side face thereof and sloping from the front surface of the display unit rearwardly and outwardly of the display unit.

15. An electronic device according to claim 12, wherein the first cabinet segment has a pressure member projecting from the rear surface thereof for pressing on a front surface of the display unit.

16. An electronic device according to claim 12, further comprising:
- a second spring member provided on the holder for biasing the display unit in a direction different from said one direction by coming into contact with a third side face of the display unit;
- a second stopper member provided on the holder for restraining the movement of the display unit by the second spring member; and
- a second positioning member projecting from the rear surface of the first cabinet segment and provided with a reference face for a fourth side face of the display unit to come into contact with, the display unit being holdable between the second spring member and the second positioning member when the first cabinet segment is attached to the second cabinet segment,
- the display unit or the second positioning member being provided with a second guide for moving the display unit as held between the second spring member and the second stopper member against the biasing force of the second spring member until the fourth side face of the display unit comes into contact with the reference face when the first cabinet segment is attached to the second cabinet segment.

17. An electronic device according to claim 16, wherein the direction in which the display unit is biased by the second spring member is approximately orthogonal to the direction in which the display unit is biased by the first spring member.

18. An electronic device according to claim 16, wherein the first guide is a guide face sloping from an outer end of the first positioning member toward the opening, and the second guide is a guide face sloping from an outer end of the second positioning member toward the opening.

19. An electronic device according to claim 16, wherein the first guide is a guide face formed between a front surface of the display unit and the second side face thereof and sloping from the front surface of the display unit rearwardly and outwardly of the display unit, and the second guide is a guide face formed between the front surface of the display unit and the fourth side face thereof and sloping from the front surface of the display unit rearwardly and outwardly of the display unit.

20. An electronic device according to claim 16, wherein the first cabinet segment has a pressure member projecting from the rear surface thereof for pressing on a front surface of the display unit.

* * * * *